United States Patent
Kanda et al.

(10) Patent No.: US 7,371,020 B2
(45) Date of Patent: May 13, 2008

(54) METHOD OF ALIGNING OPTICAL-FIBERS, OPTICAL-FIBER ALIGNMENT DEVICE, AND OPTICAL-FIBER FUSION SPLICER

(75) Inventors: Yoshiharu Kanda, Sakura (JP); Kenji Takahashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/148,372

(22) Filed: Jun. 9, 2005

(65) Prior Publication Data

US 2005/0276550 A1 Dec. 15, 2005

(30) Foreign Application Priority Data

Jun. 10, 2004 (JP) ............... P2004-172730

(51) Int. Cl.
G02B 6/255 (2006.01)

(52) U.S. Cl. .......................... 385/98; 385/96
(58) Field of Classification Search ............ 385/96–98; 219/121.31; 65/407
See application file for complete search history.

(56) References Cited

U.S. PATENT DOCUMENTS 4,715,876 A * 12/1987 Osaka et al. ............ 65/407

2004/0067026 A1 4/2004 Kanda et al.

FOREIGN PATENT DOCUMENTS

| JP | S59-002013 A | | 1/1984 |
| JP | 2004-184962 | * | 2/2004 |
| JP | 2004-184962 A | | 7/2004 |

OTHER PUBLICATIONS

Chinese Office Action issued in corresponding Chinese Patent Application No. 200510076377.6, dated Nov. 23, 2007.

* cited by examiner

*Primary Examiner*—Michelle Connelly-Cushwa
*Assistant Examiner*—Jerry Rahll
(74) *Attorney, Agent, or Firm*—Sughrue Mion, PLLC

(57) ABSTRACT

A method of aligning optical-fibers, including: holding a sheath of an optical-fiber ribbon cord using an optical-fiber holder so that distal ends of optical fibers extending from the sheath are located above grooves of a groove stage; arranging an optical-fiber guide on one side of the sheath, as the sheath is held by the optical-fiber holder, on a first side of the optical-fiber holder, wherein the optical-fiber guide has oblique portions adjacent to transverse sides of the sheath; moving the optical-fiber guide in a first direction toward the sheath so that at least one of the oblique portions aligns the sheath to the transverse center of the optical fiber guides; and moving the optical-fiber guide in a direction opposite the first direction to align the optical-fibers into the grooves of the groove stage.

6 Claims, 13 Drawing Sheets

METHOD OF ALIGNING OPTICAL-FIBERS, OPTICAL-FIBER ALIGNMENT DEVICE, AND OPTICAL-FIBER FUSION SPLICER

CROSS-REFERENCE TO RELATED APPLICATIONS

This application is based upon and claims the benefit of priority from Japanese Patent Application. No. 2004-172730 filed on Jun. 10, 2004 in the Japanese Patent Office; the entire contents of which are incorporated herein by reference.

BACKGROUND OF THE INVENTION

The invention relates to a method of aligning optical-fibers. According to this method, an optical-fiber holder hold a sheath of an optical-fiber, the ends of bare optical-fibers exposed from the sheath are received and aligned in a groove of a groove stage provided inner side than the optical-fiber holder and aligned. This invention also relates to an optical-fiber alignment device and an optical-fiber fusion splicer using the method of aligning optical-fibers.

A related optical-fiber fusion splicer includes an optical-fiber alignment device and fusion splicer means. The sheaths of ends of four-wire optical-fiber ribbon cords as a pair of optical-fibers are removed to expose bare optical-fibers. The optical-fiber alignment device includes a groove stage for aligning the bare optical-fibers so that the opposite sides of the bare optical-fibers are abutted against each other. The groove stage includes opposed V-grooves as grooves formed on the surface of a portion of the groove stage. The optical-fiber alignment device includes a pair of optical-fiber holders which respectively hold the sheaths of the pair of optical-fiber ribbon cords. The optical-fiber holders are positioned on an optical-fiber holding stage to hold the sheaths.

When the bare optical-fibers of the pair of optical-fiber ribbon cords are mounted on the predetermined V-grooves, an operator manually moves the optical-fiber holders which holds the sheath of the optical-fiber ribbon cords, and aligns (positions) the bare optical-fibers into the predetermined V-grooves. When the optical-fiber holder is used, the operator moves the optical-fiber holders with his/her one hand so that all of the bare optical-fibers are received in the respective V-grooves. When they are to be positioned, the operator operates a clamp lever using the other hand to clamp the optical-fiber holder.

The optical-fiber holder has a bottom surface with a recess. The optical-fiber holding stage has an upper surface with a projection functioning as a mounting surface on which the optical-fiber holder is to be mounted. The two projecting and recessed fitting portions have a gap therebetween. The gap allows the optical-fiber holder to move, and to precisely position the bare optical-fibers in the V-grooves.

Another optical-fiber fusion splicer includes V-grooves. The slits as many as the V-grooves projecting higher than the V-grooves are fixed to the rear side of the V-grooves. The slits and the V-grooves are aligned with each other. Therefore, if the bare optical-fibers are inserted into the slits, the bare optical-fibers are guided by the slits to be arrayed parallel to each other and thus, the bare optical-fibers are received in the V-grooves as they are (see, for example, Japanese Patent Application Laid-open No. S59-2013).

In the former fusion splicer of the optical-fiber ribbon cord, the extremely narrow gap and width of the V-groove makes it very difficult for an operator to manually position the bare optical-fiber to the V-groove while visually checking this state.

When the optical-fiber holder is to be clamped, the optical-fiber holder is moved to cause the bare optical-fiber to come out from the predetermined V-groove in some cases. This causes variations in operational speed according to differences in skill of operators.

In the latter optical-fiber fusion splicer, when the respective bare optical-fibers are to be inserted into the slits, it is troublesome to manually position the bare optical-fiber and the slit to each other. When the bare optical-fibers are to be inserted or pulled out, the fixed slits necessarily move parallel to the bare optical-fibers, and the operator needs pay attention, thus rendering the operation difficult.

SUMMARY OF THE INVENTION

The invention is accomplished to solve the problems.

The first aspect of the invention provides a method of aligning optical-fibers. The method includes holding a sheath of an optical-fiber ribbon cord using an optical-fiber holder so that distal ends of optical fibers extending from the sheath are located above grooves of a groove stage; arranging an optical-fiber guide on one side of the sheath, as the sheath is held by the optical-fiber holder, on a first side of the optical-fiber holder, wherein the optical-fiber guide has oblique portions adjacent to transverse sides of the sheath; moving the optical-fiber guide in a first direction toward the sheath so that at least one of the oblique portions aligns the sheath to the transverse center of the optical fiber guide; and moving the optical-fiber guide in a direction opposite the first direction to align the optical-fibers into the grooves of the groove stage.

The second aspect of the invention includes a method of aligning optical-fibers. The method includes: holding a sheath of a single optical-fiber cable using an optical-fiber holder so that a distal end of an optical fiber extending from the sheath is located above a groove of a groove stage; arranging a single optical-fiber support, having a groove for supporting the sheath of the single optical fiber, at a first end of the optical-fiber holder; arranging an optical-fiber guide on one side of the single optical-fiber support, wherein the optical-fiber guide has oblique portions adjacent to transverse sides of the single optical-fiber support; moving the optical-fiber guide in a first direction toward the single optical-fiber support so that at least one of the oblique portions aligns the single optical-fiber support, and the single optical fiber supported thereon, to the transverse center of the optical-fiber guide; and moving the optical-fiber guide in a direction opposite the first direction to align the single optical-fiber into the groove of the groove stage.

The third aspect of the invention provides an optical-fiber alignment device. The device includes: a first optical-fiber holder holding a first sheath of a first optical-fiber cable; a first groove stage, located on one side of the first optical-fiber holder, comprising a first groove to receive a first optical-fiber exposed from the first sheath; and a first optical-fiber guide, movable in an orthogonal direction to a direction of extension of the optical-fiber, located on one side of the first sheath, when the sheath is held by the first optical-fiber holder, and between the first groove stage and the first optical-fiber holder, wherein the first optical-fiber guide comprises oblique portions, relative to the vertical direction, adjacent to transverse sides of the first sheath.

The fourth aspect of the invention provides an optical-fiber alignment device. The device includes: a first optical-fiber holder holding a first sheath of a first optical-fiber cable; a first groove stage, located on one side of the first optical-fiber holder, comprising a first groove to receive a first optical-fiber exposed from the first sheath; a first single optical-fiber support, located at a first end of the first optical-fiber holder, comprising a first groove holding the first sheath; and a first optical-fiber guide, movable in an orthogonal direction to a direction of extension of the optical-fiber, located on one side of the first single optical-fiber support, wherein the first optical fiber guide comprises oblique portions adjacent to transverse sides of the first sheath.

The fifth aspect of the invention provides an optical-fiber fusion splicer. The fusion splicer includes: a first optical-fiber holder holding a first sheath of a first optical-fiber cable; a first groove stage, located on one side of the first optical-fiber holder, comprising a first groove to receive a first optical-fiber exposed from the first sheath; and a first optical-fiber guide, movable in an orthogonal direction to a direction of extension of the optical-fiber, located on one side of the first sheath, when the sheath is held by the first optical-fiber holder, and between the first groove stage and the first optical-fiber holder, wherein the first optical-fiber guide comprises oblique portions adjacent to transverse sides of the first sheath, wherein the optical-fiber fusion splicer further comprises a fusion splicing means configured to fusion splice the end of the first optical-fiber to an end of a second optical-fiber exposed from a second sheath.

The sixth aspect of the invention provides an optical-fiber fusion splicer. The fusion splicer includes: a first optical-fiber holder holding a first sheath of a first optical-fiber cable; a first groove stage, located on one side of the first optical-fiber holder, comprising a first groove to receive a first optical-fiber exposed from the first sheath; a first single optical-fiber support, located at a first end of the first optical-fiber holder, comprising a first groove holding the first sheath; and a first optical-fiber guide, movable in an orthogonal direction to a direction of extension of the optical-fiber, located on one side of the first single optical-fiber supports, wherein the first optical fiber guide comprises oblique portions, relative to the vertical direction, adjacent to transverse sides of the first sheath, wherein the optical-fiber fusion splicer further comprises a fusion splicing means configured to fusion splice the end of the first optical-fiber to an end of a second optical-fiber exposed from a second sheath.

The seventh aspect of the invention provides a method of aligning optical-fibers. The method includes: locating a first optical-fiber cable above a first cable positioner; locating a first optical-fiber of the first optical-fiber cable above a first fiber positioner; and moving the first cable positioner relative to the first fiber positioner to position the first optical-fiber cable to the first cable positioner, thereby positioning the first optical-fiber to the first fiber positioner for alignment of the first optical-fiber.

The eighth aspect of the invention provides an optical-fiber alignment device. The device includes: a first fiber positioner configured to align a first optical-fiber of a first optical-fiber cable; and a first cable positioner positioned near the first fiber positioner and being movable relative to the first fiber positioner to position the first optical fiber cable thereto, thereby allowing the first optical-fiber to be positioned relative to the first fiber positioner.

The ninth aspect of the invention provides an optical-fiber fusion splicer. The fusion splicer includes first and second electrodes configured to fusion splice first and second optical-fibers, of first and second optical-fiber cables, to each other; a first fiber positioner configured to align the first optical-fiber of the first optical-fiber cable between the first and second electrodes; and a first cable positioner positioned near the first fiber positioner and being movable relative to the first fiber positioner to position the first optical fiber cable thereto, thereby allowing the first optical-fiber to be positioned relative to the first fiber positioner.

According to the invention, the optical-fiber holders are set, and the optical-fiber guides are moved up to guide the sheaths of the optical-fiber cables or the single optical-fiber supports having sheaths placed thereon to be moved with the optical-fiber guides at the centers of the optical-fiber guides. The optical-fiber guides are moved down to automatically receive the optical-fibers in the groves of the groove stages. When the optical-fiber holders are set to separate the optical-fibers of the optical-fiber cables, this way corrects the optical-fibers of the optical-fiber cables in the positions to be aligned with each other.

Thus, operators save positioning of the optical-fibers during aligning, contacting and fusion splicing of the optical-fibers, achieving easy and automatic alignment.

BRIEF DESCRIPTION OF THE
ACCOMPANYING DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS

Exemplary embodiments of the invention will now be described below with reference to the accompanying drawings. The described exemplary embodiments are intended to assist the understanding of the invention, and are not intended to limit the scope of the invention in any way.

Figure 1:
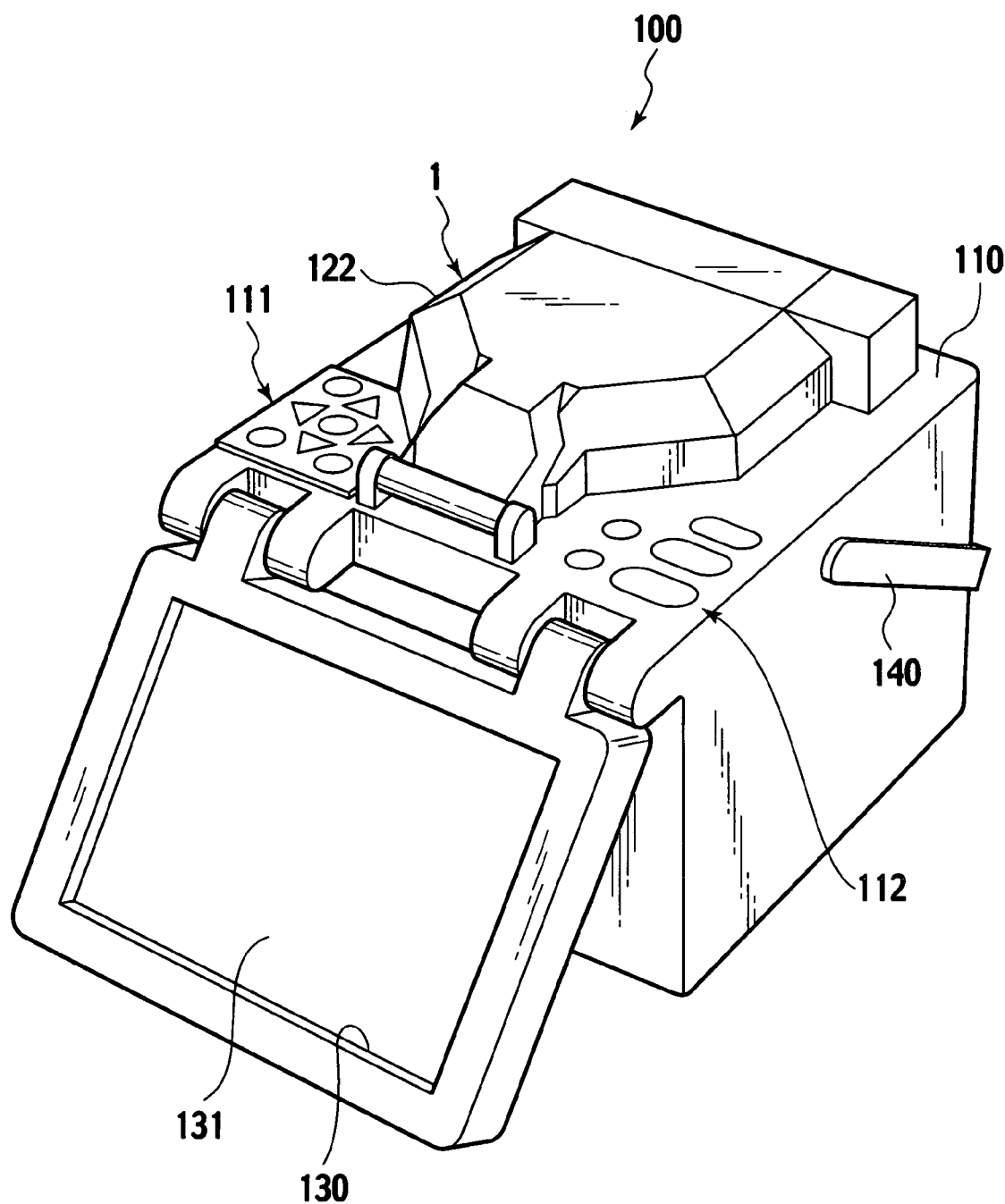
FIG. 1 is a perspective view of an optical-fiber fusion splicer according to a first exemplary embodiment of the invention.

With reference to FIG. 1, an optical-fiber fusion splicer 100 includes a casing 110 provided at the top surface with a fusion splicing device 1. The fusion splicing device 1 is covered with a cover 122. The optical-fiber fusion splicer 100 includes a monitor 130 rotatably supported by the casing 110. The monitor 130 includes a display 131 which displays the process of fusion splicing optical-fibers. The top surface of the casing 110 of the fusion splicer 100 is provided with groups of switches 111 and 112 for operation. The fusion splicer 100 includes a handle 140 mounted on the casing 110. The handle 140 is used to carry the fusion splicer 100.

Figure 2:
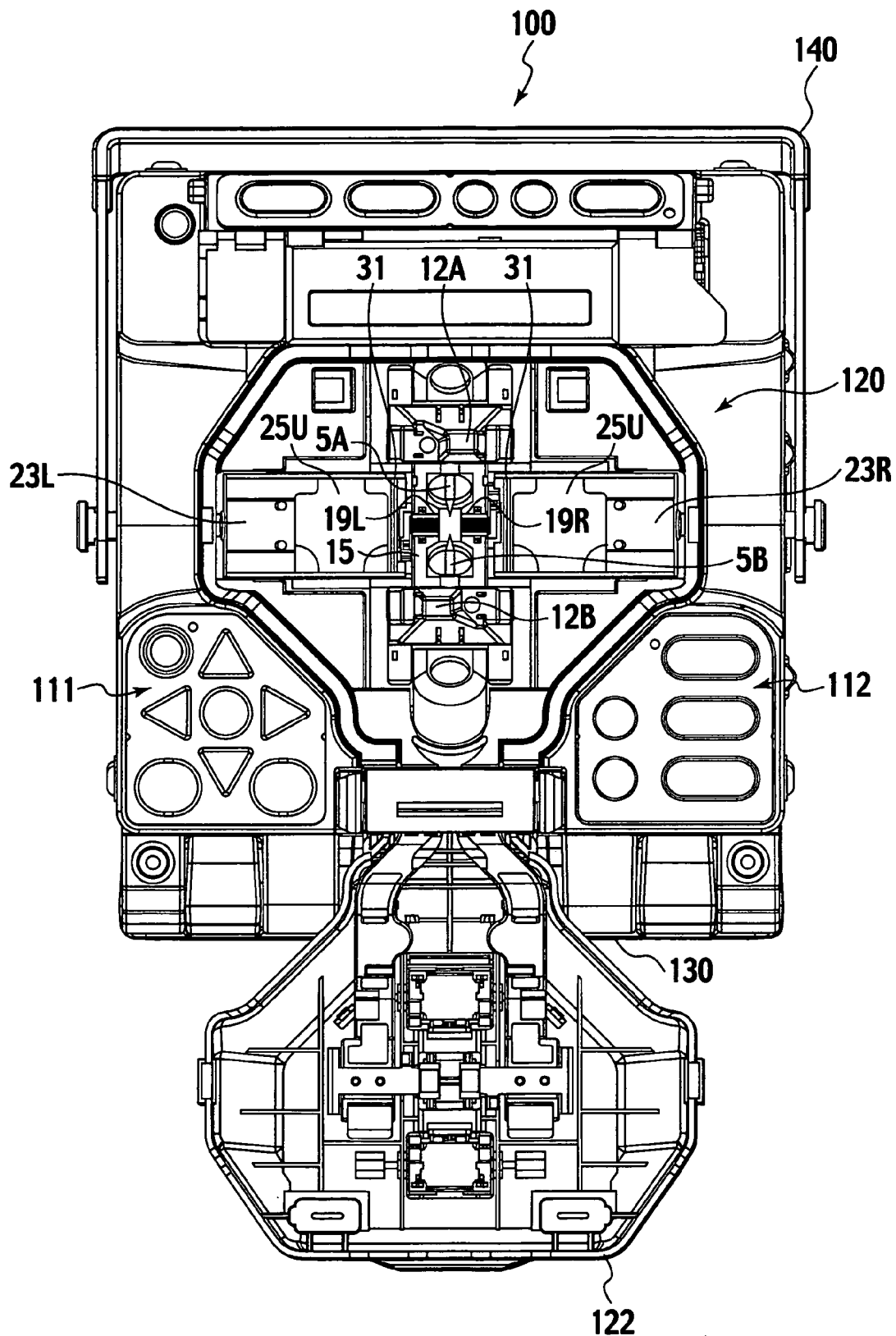
FIG. 2 is a plan view of the optical-fiber fusion splicer illustrated in FIG. 1.
Figure 3:
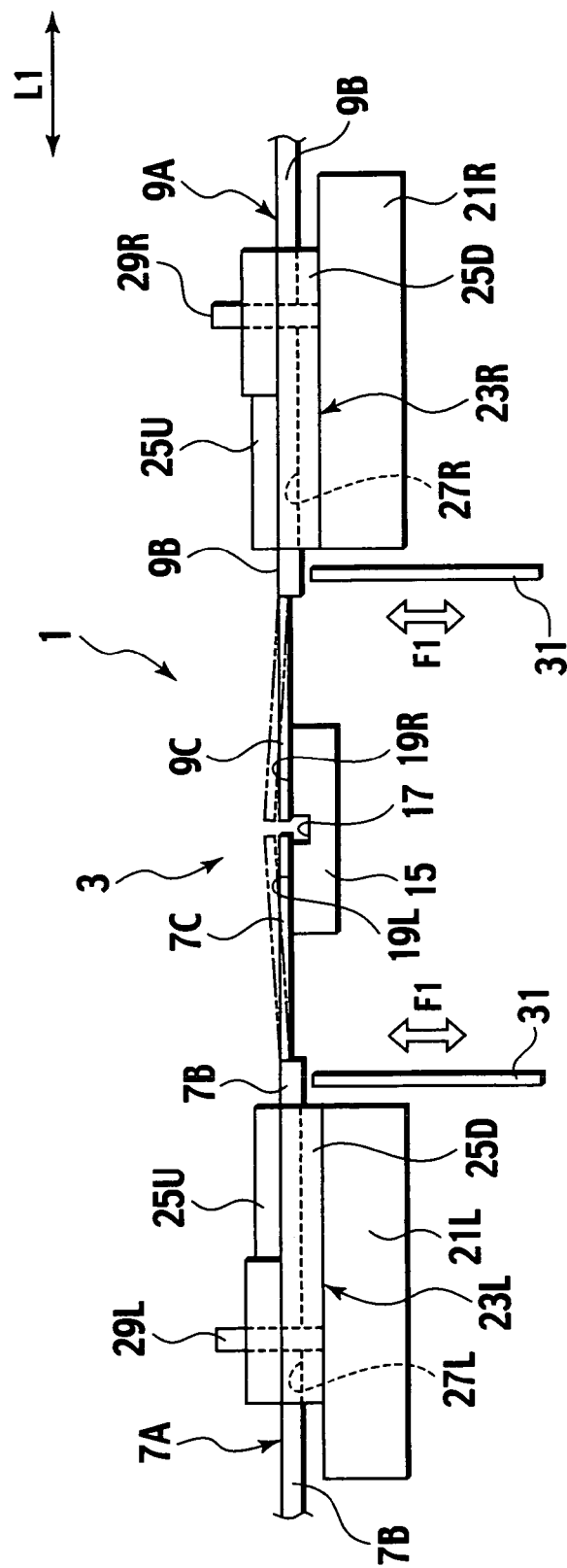
FIG. 3 is a schematic front view illustrating an optical-fiber alignment device of the optical-fiber fusion splicer illustrated in FIG. 1.
Figure 4:
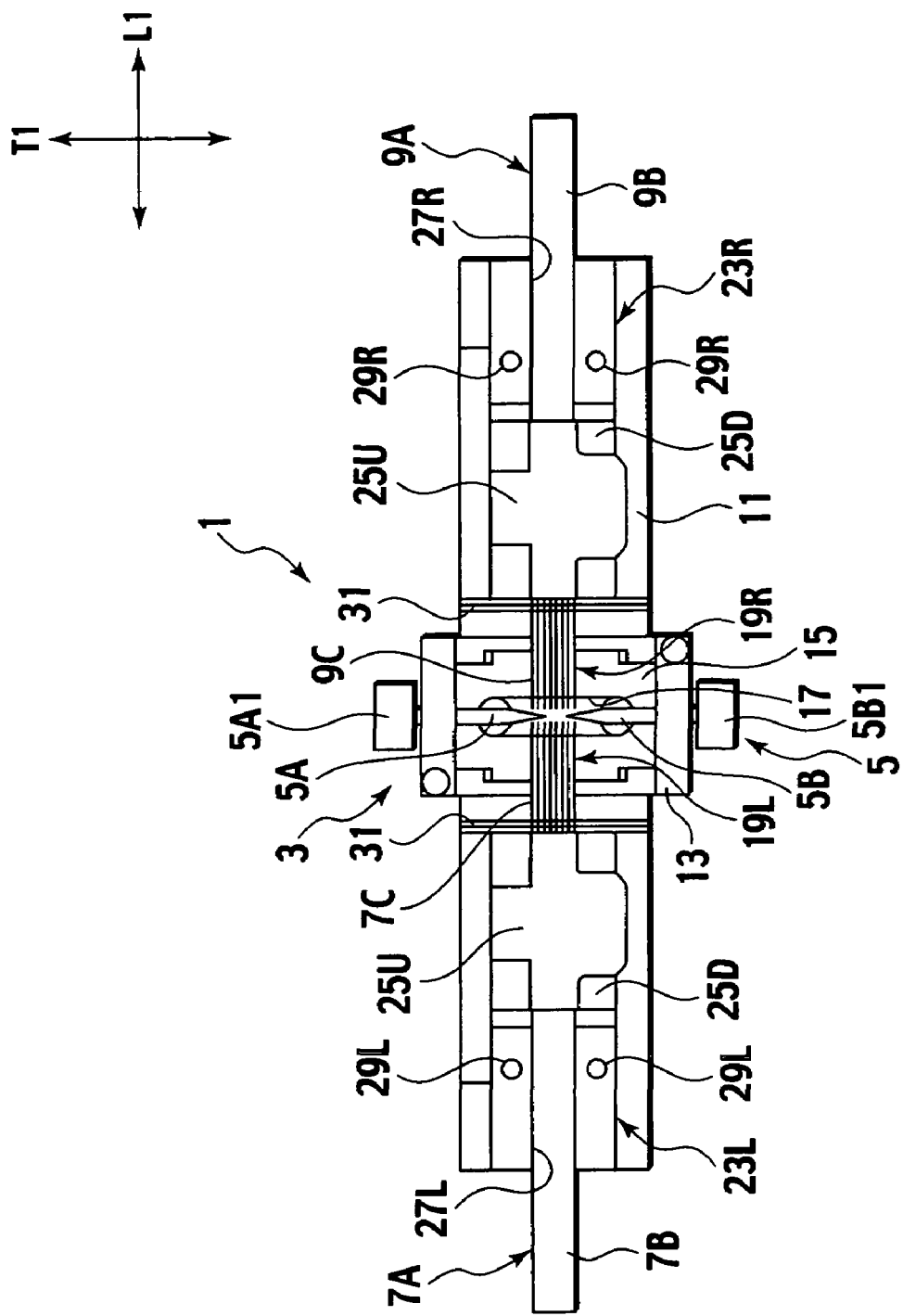
FIG. 4 is a schematic plan view illustrating an optical-fiber fusion splicing device of the optical-fiber fusion splicer illustrated in FIG. 1.

With reference to FIGS. 2 to 4, the fusion splicing device 1 for optical-fibers includes an alignment device 3 and fusion splicing means 5 for optical-fibers. In FIG. 4, the optical-fiber alignment device 3 has a pair of optical-fiber ribbon cords 7A and 9A each including four optical-fibers. Optical-fiber ribbon cords have ends with sheaths 7B and 9B, which are removed to expose the bare optical-fibers 7C and 9C. The alignment device 3 allows the bare optical-fibers 7C and 9C to abut against each other from both sides. The alignment device 3 includes a positioning frame 13 standing on the substantially central portion of a body frame 11 in a longitudinal direction L1. The positioning frame 13 is formed at the upper portion with a groove stage 15. The groove stage 15 includes a recessed portion 17 formed in the substantially central portion of the groove stage 15 in the longitudinal and transverse directions L1 and T1. The groove stage 15 includes two groups of V-grooves 19L and 19R, which are longitudinally opposed to each other with the recessed portion 17 interposed therebetween. In this example, respective V-grooves 19L and 19R are formed with four grooves at constant pitches in the transverse direction T1. The V-grooves 19L and 19R are aligned with each other. The respective four grooves of V-grooves 19L and 19R are symmetrical with respect to the center line O1 (see FIG. 7). The center lines O1 (see FIG. 7) of the groups of V-groove 19L and 19R coincide with each other in the longitudinal direction L1. The groove stage 15 includes a clamp member (not illustrated) capable of opening and closing. The clamp member clamps the bare optical-fibers 7C and 9C received in each of the V-grooves 19L and 19R.

Figure 5:
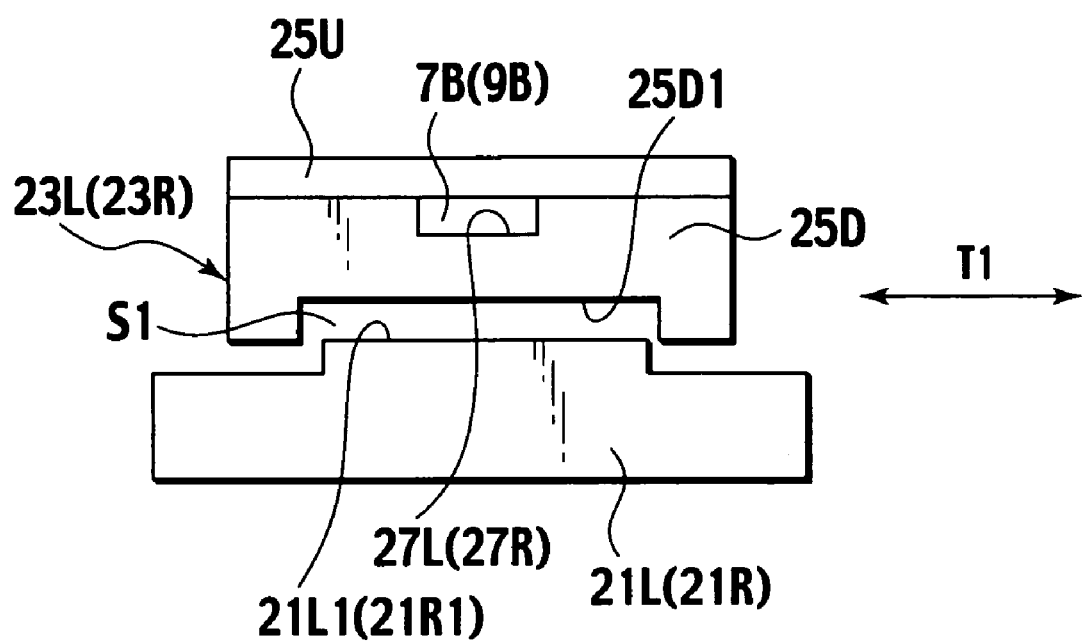
FIG. 5 is a side view of an optical-fiber holder illustrated in FIG. 4.

In FIG. 3, the optical-fiber alignment device 3 includes optical-fiber holding stages 21L and 21R on the body frame 11 on either side of the groove stage 15. The optical-fiber holding stages 21L and 21R include optical-fiber holders 23L and 23R holding the sheaths 7B and 9B thereon, respectively. The optical-fiber holders 23L and 23R include lower holders 25D and upper holders 25U, respectively. As illustrated in FIG. 5, the lower holders 25D are provided on the surfaces with rectangular openings 27L and 27R formed in the transverse direction T1 as viewed from the side surface of the lower holders 25D on which the sheaths 7B and 9B are mounted. Each of the lower holders 25D includes the upper holder 25U which opens or closes to hold the sheaths 7B and 9B by hinge pins. The optical-fiber holders 23L and 23R are positioned in the transverse direction T1 using positioning pins 29L and 29R. The optical-fiber holders 23L and 23R are displaceable from the optical-fiber holding stages 21L and 21R in the transverse direction T1 with slight backlashes.

In FIG. 4, the recessed portion 17 includes the splicer means 5 on both sides of the transverse direction T1. The splicer means 5 fuses the bare optical-fibers 7C and 9C, which are abutted against each other by the V-grooves 19L and 19R, and connects the bare optical-fibers 7C and 9C to each other. In FIG. 4, the splicer means 5 respectively includes discharge electrode rods 5A and 5B in the transverse direction T1. The discharge electrode rods 5A and 5B have collars 5A1 and 5B1 at their ends. The collars 5A1 and 5B1 are held by electrode holders 12A and 12B (see FIG. 2).

When the bare optical-fibers 7C and 9C of the optical-fiber ribbon cords 7A and 9A are to be mounted on predetermined V-grooves 19L and 19R, an operator manually moves the optical-fiber holders 23L and 23R which hold the sheaths 7B and 9B of the optical-fiber ribbon cords 7A and 9A to align or position the V-grooves 19L and 19R and the bare optical-fibers 7C and 9C to each other. When the optical-fiber holders 23L and 23R are to be used, the operator moves the optical-fiber holders 23L and 23R with his or her one hand, and respective bare optical-fibers 7C and 9C are received into the corresponding V-grooves 19L and 19R. When they are aligned, the operator clamps the upper holder 25D in the lower holder 25U using the other hand.

As illustrated in FIG. 5, the lower holders 25D of the optical-fiber holders 23L and 23R include recessed bottom surfaces 25D1. The optical-fiber holding stages 21L and 21R include projecting upper surface 21L1 (21R1) as mounting surfaces, and the optical-fiber holders 23L and 23R are mounted thereon. Two fitting portions of the projecting shape and recessed shape have a gap S1 therebetween. According to this structure, the optical-fiber holders 23L and 23R are moved, and the bare optical-fibers 7C and 9C are precisely positioned with respect to the V-grooves 19L and 19R.

As illustrated in FIGS. 3 and 4, the sheaths 7B and 9B of the optical-fiber ribbon cords 7A and 9A held by the optical-fiber holders 23L and 23R project forward from the optical-fiber holders 23L and 23R The projecting sheaths 7B and 9B have plate-like optical-fiber guides 31 at the lower positions. The optical-fiber guides 31 are vertically movable and rises or sets upward or downward with respect to the V-grooves 19L and 19R of the groove stages 15.

Figure 6A:
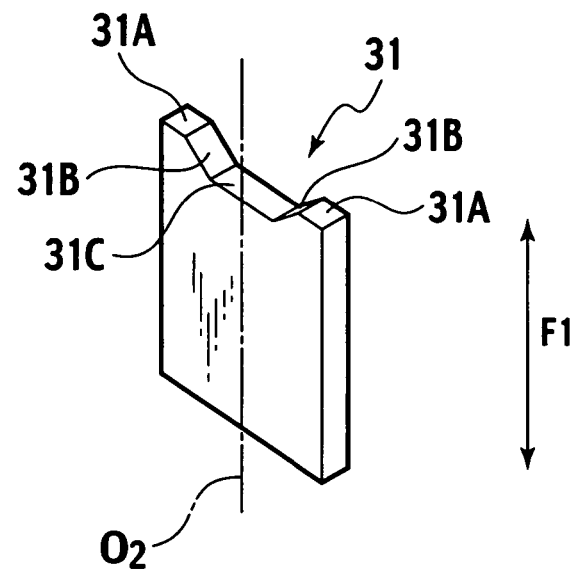
FIG. 6A is a perspective view of an optical-fiber guide illustrated in FIGS. 3 and 4.
Figure 7:
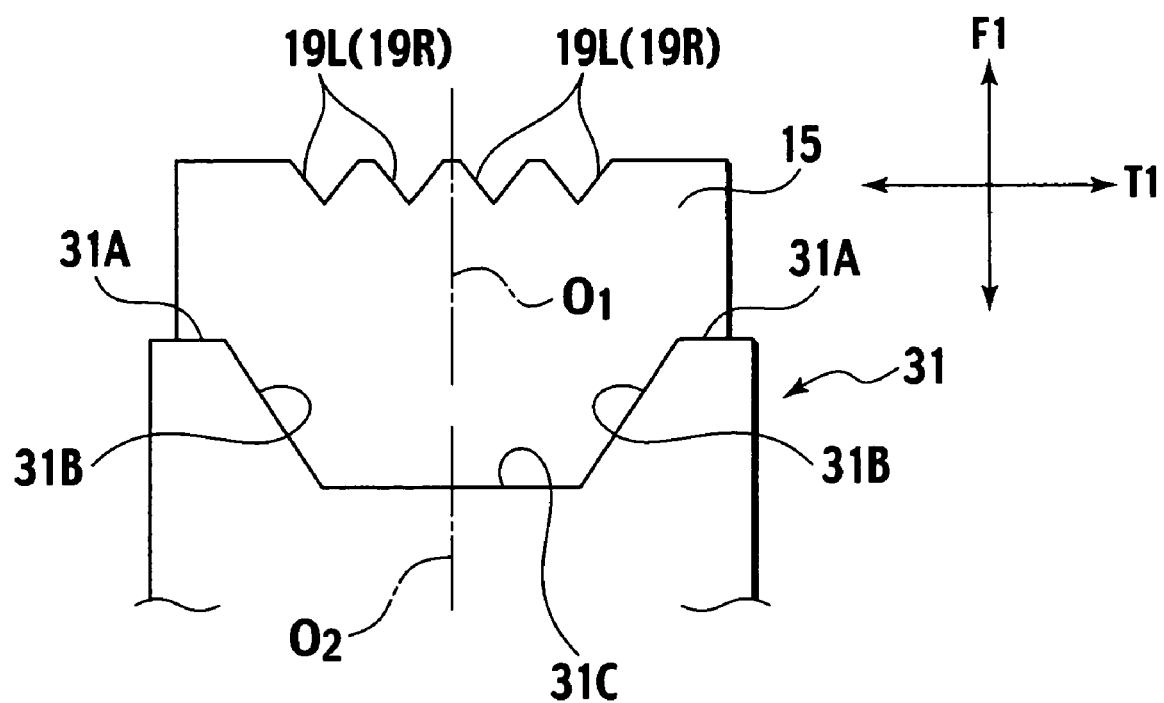
FIG. 7 is a front view used for explaining a layout relation between a groove stage and the optical-fiber guide.

As clearly illustrated in FIGS. 6A and 7, the optical-fiber guide 31 has a pair of outer flat walls 3 1A disposed symmetrically with respect to the center line O2 and extending perpendicularly with respect to the center line O2. The outer flat walls 31B are flush with each other. The center line O2 corresponds to the direction (vertical direction) F1 in which the optical-fiber guide 31 moves. The optical-fiber guide 31 includes a pair of oblique walls 31B as guide walls which are continuously formed with the outer flat walls 31A. Both the oblique walls 31B extends obliquely from the outer flat walls 31A and inward of the optical-fiber guide 31. The oblique walls 31B are disposed symmetrically with respect to the center line O2, and are set to certain angles with respect to the outer flat walls 31A. The oblique walls 31B may form symmetrically projected or recessed curved surfaces. The optical-fiber guide 31 includes a central flat part 31C which is in parallel to the outer flat walls 31A and is continuously formed with the oblique walls 31B. As illustrated in FIG. 7, the groove stage 15 and the optical-fiber guide 31 have center lines O1 and O2 which are aligned substantially on a straight line. That is, the pair of oblique walls 31B are positioned to the groups of V-grooves 19L and 19R of the groove stage 15 in the transverse direction T1.

Figure 6B:
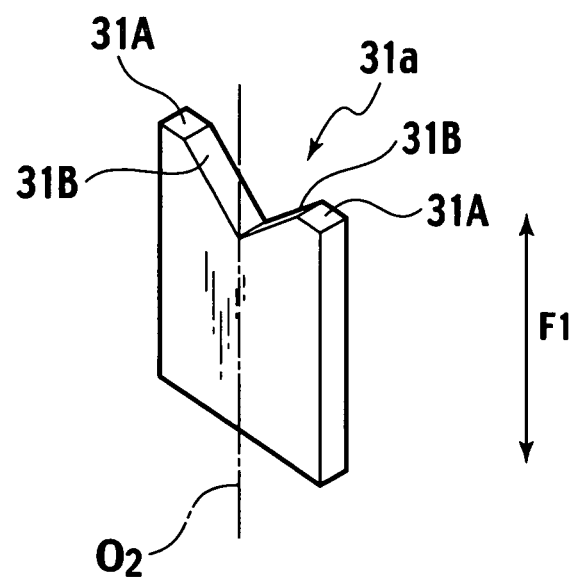
FIG. 6B is a perspective view of an optical-fiber guide according to a modification.

As illustrated in FIG. 6B, the optical-fiber guide 31a may have V-shaped oblique walls 31B which extends obliquely with respect to the outer flat walls 31A and which are joined to each other.

Figure 8:
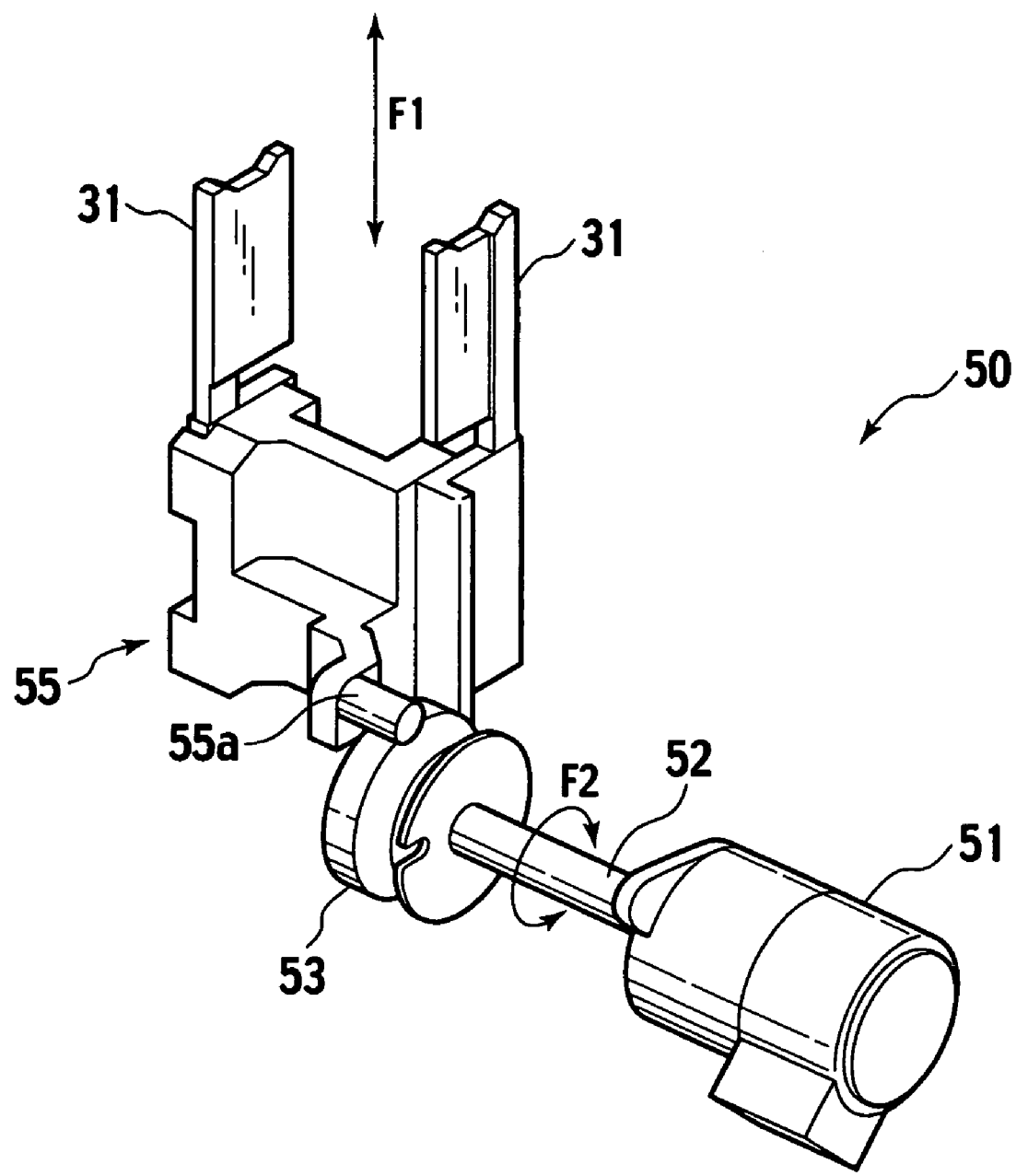
FIG. 8 is a perspective view illustrating an actuator for the optical-fiber guide illustrated in FIG. 6A.

As illustrated in FIG. 8, the alignment device 3 includes an actuator 50 that vertically moves a guide 31. The actuator 50 includes a stepper motor 51 and a shaft 52 connected to the stepper motor 51. The actuator 50 includes a cam 53 fixed to the shaft 52. The actuator 50 also includes a bracket 55 formed on the cam 53. The bracket 55 includes a follower rod 55a which is movable on the cam 53, and is connected to the guide 31. If the motor 51 rotates the shaft 52 in the clockwise direction or counterclockwise direction, the shaft 52 rotates the cam 53a, and the bracket 55 and the guide 31 are moved in the vertical direction F1.

The operation of the optical-fiber fusion splicer will be described next.

In FIG. 4, the sheaths 7B and 9B of the two optical-fiber ribbon cords 7A and 9A are removed to expose the bare optical-fibers 7C and 9C. The optical-fiber holding stages 21L and 21R are respectively provided with the optical-fiber ribbon cords 7A and 9A.

The cover 122 (see FIG. 2) is closed and the switches 111 and 112 (see FIG. 1) are operated.

For abutting the ends of the bare optical-fibers 7C and 9C of the optical-fiber ribbon cords 7A and 9A against each other, the sheaths 7B and 9B of the optical-fiber ribbon cords 7A and 9A are positioned with respect to the optical-fiber holders 23L and 23R, and the ends of the bare optical-fibers 7C and 9C are clamped. With this structure, the widths of the optical-fiber ribbon cords 7A and 9A are received in the openings 27L and 27R The optical-fiber holders 23L and 23R come into tight contact with projecting reference surfaces 21L1 and 21R1 of the optical-fiber holding stages 21L and 21R to push the sheaths 7B and 9B from above and below, thus precisely positioning the optical-fiber ribbon cords 7A and 9A in the longitudinal direction.

Figure 9:
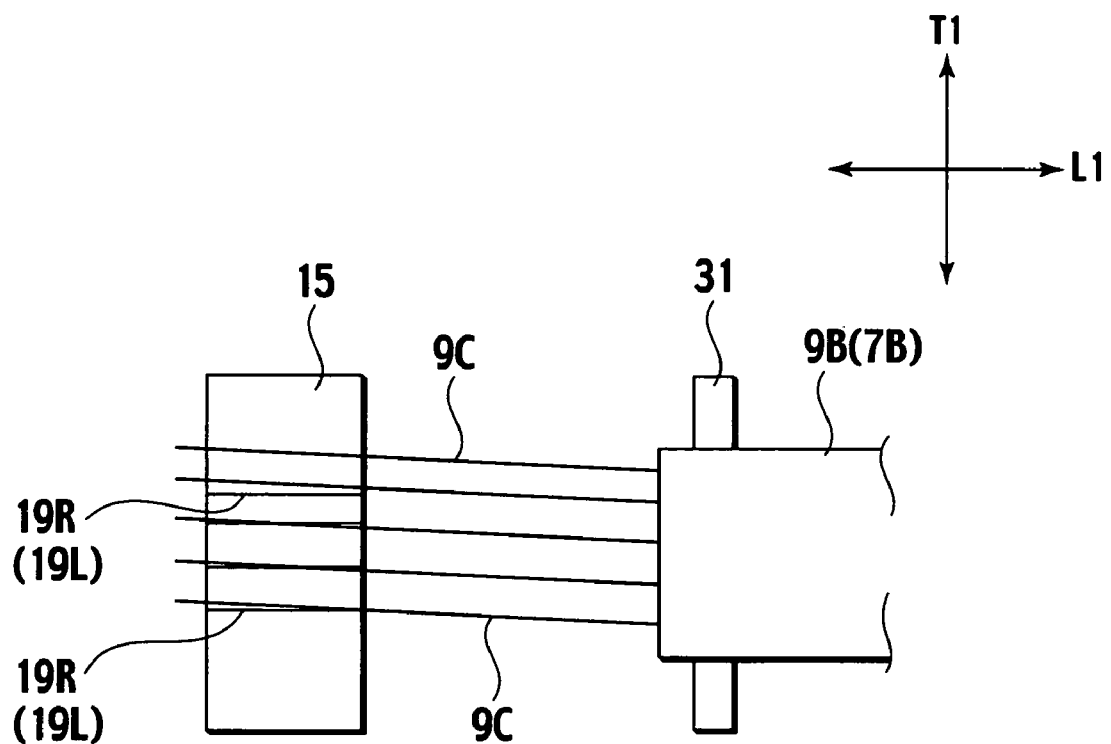
FIG. 9 is a plan view illustrating an optical-fiber ribbon cord in which the bare optical-fibers comes out from grooves.
Figure 10A:
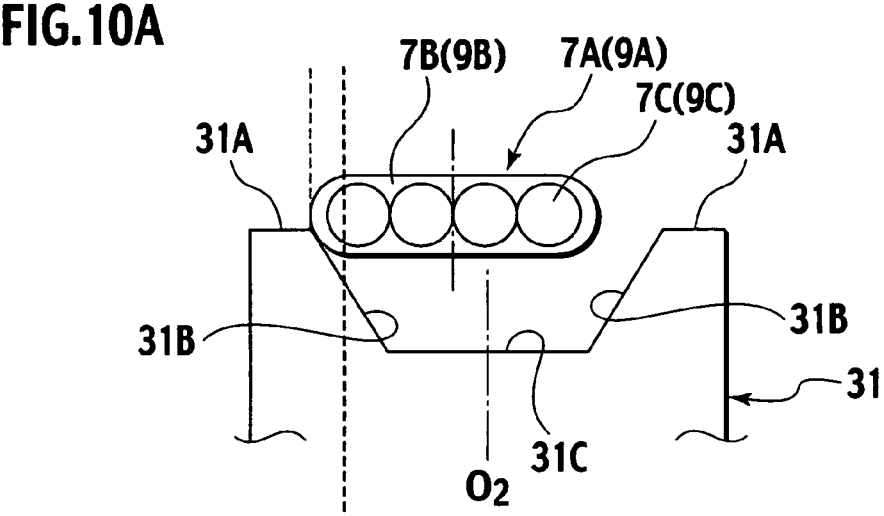
FIGS. 10A and 10B show operation of the optical-fiber guide while the bare optical-fibers of the optical-fiber ribbon cord comes out from the groove.
Figure 10B:
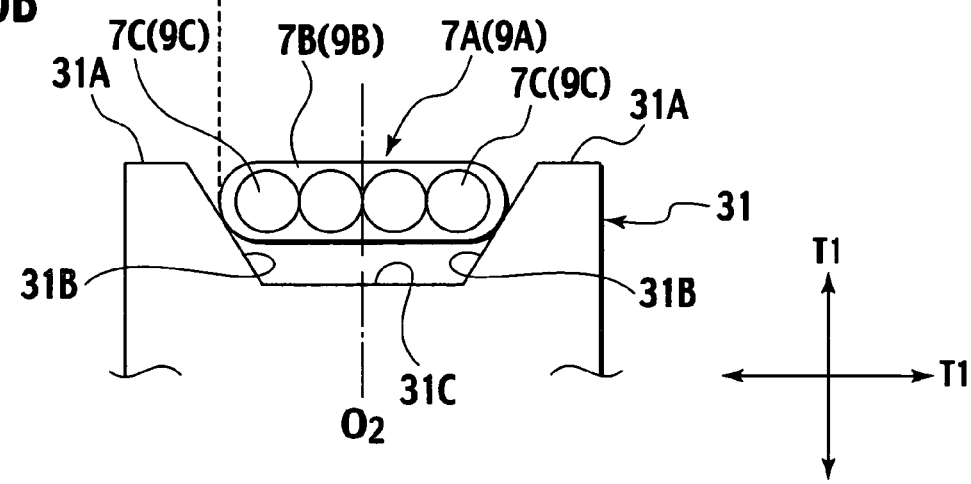

When the optical-fiber holders 23L and 23R are set, if the end of the bare optical-fibers 9C comes out from the V-grooves 19L and 19R as illustrated in FIG. 9, the optical-fiber guide 31 moves upward to push the sheaths 9B and 7B up as illustrated in FIG. 3. This pushing up motion guides the sheaths 7B and 9B in the state illustrated in FIG. 10A by the oblique wall 31B of the optical-fiber guide 31. This guiding operation moves the sheaths 7B and 9B together with the optical-fiber holders 23L and 23R to the position of the center line O2 of the optical-fiber guide 31, and easily align the bare optical-fibers 7C and 9C with each other in respective oblique walls 31B of the optical-fiber guide 31. That is, the oblique walls 31B allow the centers of the sheaths 7B and 9B in the transverse direction T1 to coincide with the centerline O2. This operation positions the sheaths 7B and 9B with respect to the group of grooves 19L and 19R, and introduces the bare optical-fibers 7C and 9C into the grooves 19L and 19R. If the optical-fiber guide 31 is then lowered in this state, the ends of the bare optical-fibers 7C and 9C are automatically and reliably received into the predetermined V-grooves 19L and 19R. Thereafter, the clamp member (not illustrated) pushes the bare optical-fibers 7C and 9C from above, and the optical-fiber holders 23L and 23R are moved inward for example. This moving operation allows the ends of the bare optical-fibers 7C and 9C of the optical-fiber ribbon cords 7A and 9A to precisely abut against each other. Arc discharge is allowed to flow from a discharge electrode rod 5A toward a discharge electrode rod 5B of the optical-fiber fusion splicer means 5, and the abutted bare optical-fibers 7C and 9C are fused and spliced to each other. This state is displayed on the display 131 (see FIG. 1) of the monitor 130.

If the alignment state is unsatisfactory, the positioning operation is repeated to more reliably align the bare optical-fibers 7C and 9C with each other in respective predetermined V-grooves 19L and 19R.

A method of aligning other bare optical-fibers 7C and 9C with each other and butting them against each other will be described as follows. The bare optical-fibers 7C and 9C constitute an essential portion according to another embodiment of this invention. The structure of the optical-fiber fusion splicer 1 is the identical to that of the previous embodiment, while the following process may be employed as the method of aligning optical-fibers and the fusing and connecting method.

In the previous process, the optical-fiber guide 31 is previously lower to the position below the sheaths 7B and 9B. The optical-fiber ribbon cords 7A and 9A are held by the optical-fiber holders 23L and 23R and then, the optical-fiber guide 31 is moved upward. With this structure, the sheaths 7B and 9B are once aligned, the optical-fiber guide 31 is lowered, and the ends of the bare optical-fibers 7C and 9C are received in the V-grooves 19L and 19R. According to another method, the optical-fiber guide 31 is moved upward to a position higher than the V-grooves 19L and 19R from the beginning, the sheaths 7B and 9B of the optical-fiber ribbon cords 7A and 9A are held by the optical-fiber holders 23L and 23R, and the sheaths 7B and 9B are aligned in the oblique walls 31B of the optical-fiber guide 31. The optical-fiber guide 31 is then lowered. This method obtains the identical effect to that obtained by the previous process.

With the above process, even if the bare optical-fibers 7C and 9C come out from the V-grooves 19L and 19R of the groove stage 15, the bare optical-fibers 7C and 9C are automatically received in the predetermined V-grooves 19L and 19R by the optical-fiber guide 31. This eliminates the necessity of the operator's positioning operation, and eliminates variation in operational speed which may be caused by difference in skill of operators.

After the bare optical-fibers 7C and 9C are set by the optical-fiber holders 19L and 19R, the optical-fiber guide 31 moves vertically to automatically align the bare optical-fibers 7C and 9C. This eliminates the inconvenience of positioning operation of the bare optical-fibers 7C and 9C into the slits unlike the latter conventional technique, and it is possible to efficiently set the bare optical-fibers 7C and 9C.

While the optical-fiber ribbon cords 7A and 9A are set to the optical-fiber holders 23L and 23R or detached therefrom, the optical-fiber guide 31 is lowered to a position lower than the V-grooves 19L and 19R With this structure, even if the operator does not concentrate on the operation, it is possible to prevent the bare optical-fibers 7C and 9C from being damaged or broken, and excellent operability can be achieved unlike the latter conventional technique.

Figure 11:
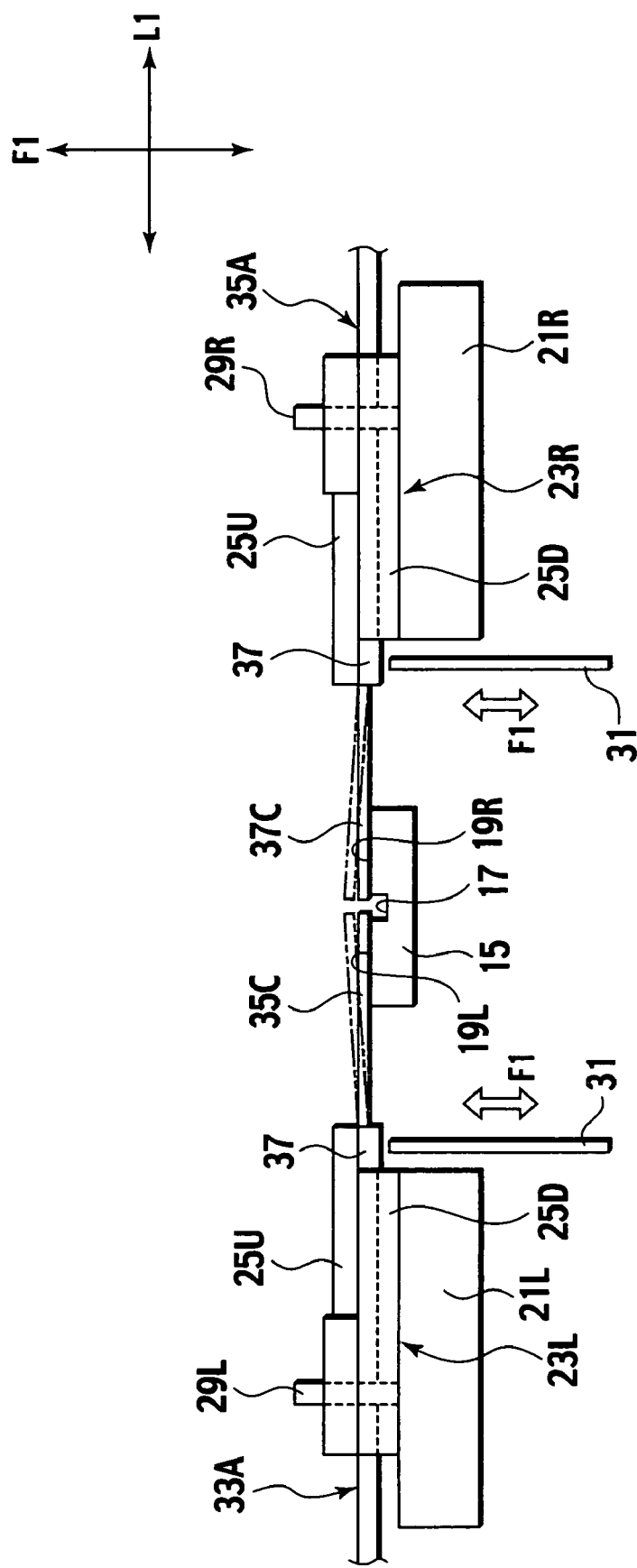
FIG. 11 is a schematic front view illustrating an optical-fiber alignment device according to a second embodiment.
Figure 12:
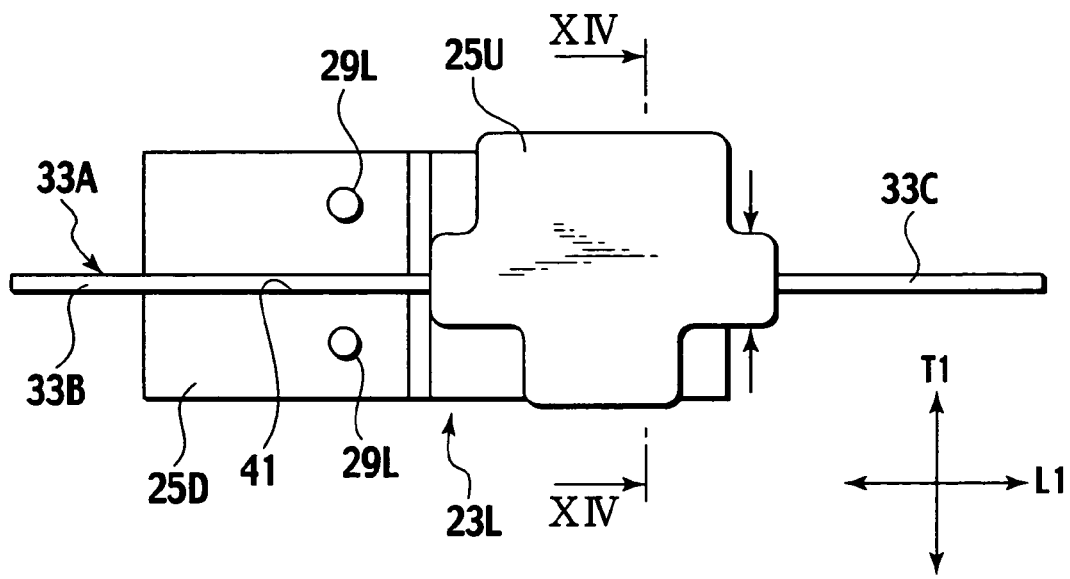
FIG. 12 is a plan view of a left optical-fiber holder illustrated in FIG. 11.
Figure 13:
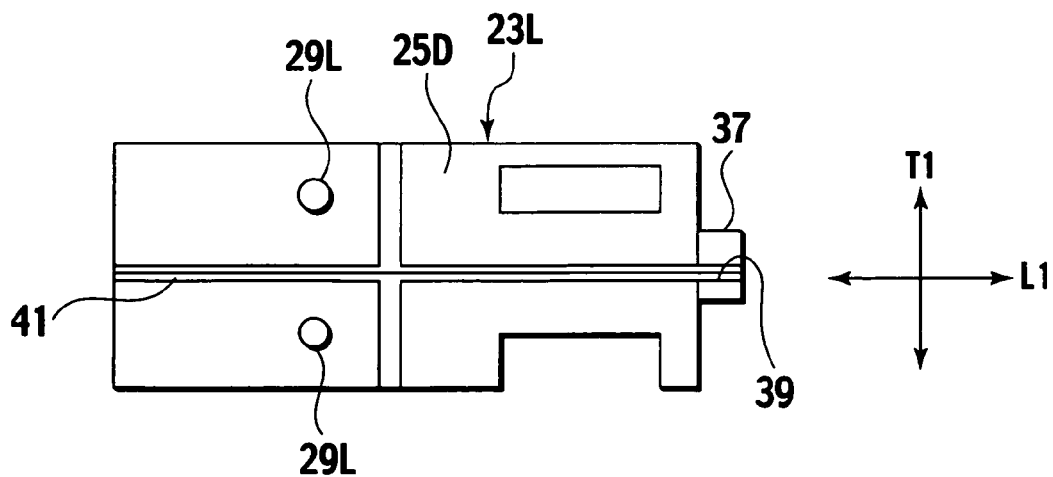
FIG. 13 is a plan view of a lower holder illustrated in FIG. 12.

FIGS. 11 to 13 show examples for aligning, and fusing and connecting single-wire optical-fibers 33A and 35A of optical-fiber cords or optical-fiber strands. In FIGS. 11 to 13, like parts as those illustrated in FIGS. 3 and 4 are designated with like reference symbols, and redundant explanation will be omitted.

Figure 14:
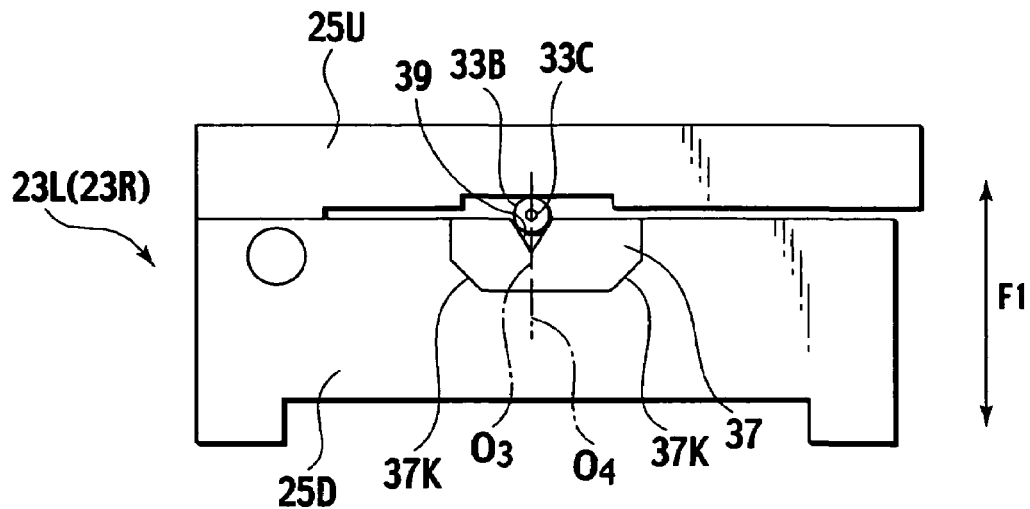
FIG. 14 is a sectional view taken along the line XIV-XIV in FIG. 12.
Figure 15A:
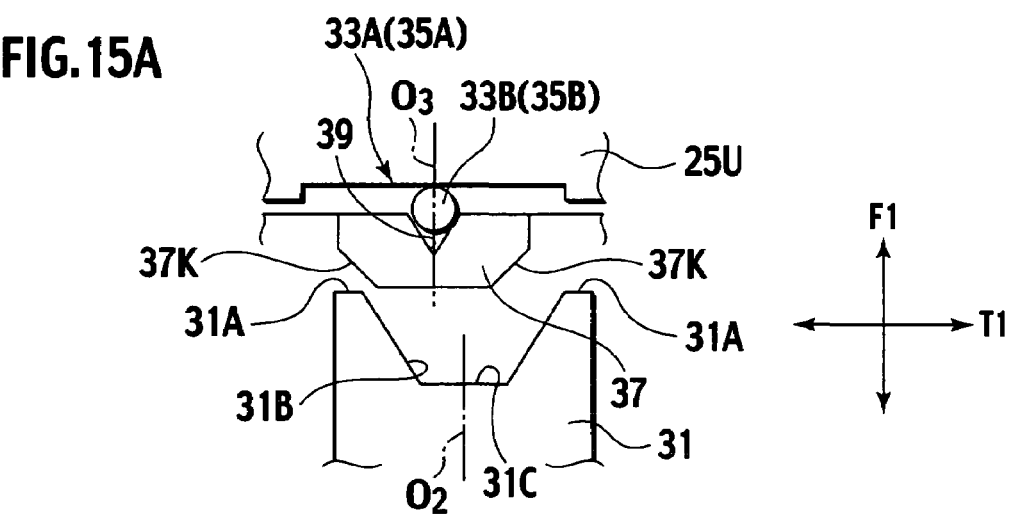
FIGS. 15A and 15B are diagram illustrating the operation of the optical-fiber guide while the bare optical-fiber of a single-wire optical-fiber comes out from the groove.
Figure 15B:
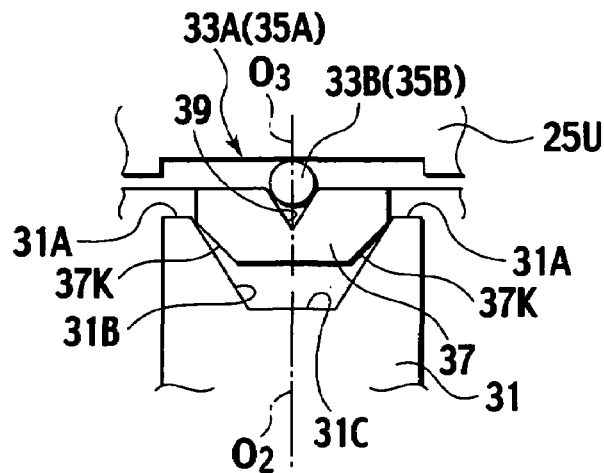

In FIGS. 11 to 13, ends of the optical-fiber holders 23L and 23R support a single-wire supporting part 37. The single-wire supporting part 37 includes an optical-fiber guide 31 which is located below the single-wire supporting part 37 and which is capable of moving in the vertical direction F1. That is, as illustrated in FIG. 14, the single-wire supporting part 37 is provided at the opposite outer sides with oblique walls 37K. As illustrated in FIGS. 15A and 15B, the oblique walls 37K engage with oblique walls 31B formed on the optical-fiber guide 31. FIGS. 12 and 13 show a concrete structure of the left optical-fiber holder 23L. The structure of the right optical-fiber holder 23R is symmetric with that of the left optical-fiber holder 23L and has the identical structure and thus, detailed description of the structure will be omitted.

As illustrated in FIGS. 13 and 14, the single-wire supporting part 37 is provided at the central portion with a V-groove 39 as a groove. The V-groove 39 is aligned with V-grooves 41 of the optical-fiber holders 23L and 23R That is, a center O3 of the single-wire supporting part 37 and a center O4 of the optical-fiber holders 23L and 23R are aligned with each other.

According to this structure, since the ends of the bare optical-fibers 33C and 35C of the single-wire optical-fibers 33A and 35A are abutted against each other, the sheaths 33B and 35B of the single-wire optical-fibers 33A and 35A are positioned by the optical-fiber holders 23L and 23R and clamp is set. The widths of the single-wire optical-fibers 33A and 35A are received in the V-groove 41 and pushed from above and below and thus, the optical-fibers 33A and 35A come into tight contact with projected reference surfaces of the optical-fiber holding stages 21L and 21R. With this structure, the single-wire optical-fibers 33A and 35A are positioned precisely in the longitudinal direction.

When the optical-fiber holders 23L and 23R are set, when if the ends of the bare optical-fibers 33C and 35C come out from the V-grooves 19L and 19R of the groove stage 15 like the case illustrated in FIG. 9, the optical-fiber guide 31 rises and pushes up the single-wire supporting part 37 once. This structure allows the single-wire supporting part 37 to be guided by the oblique walls 31B of the optical-fiber guide 31, and they are moved to the center position of the optical-fiber guide 31 together with the optical-fiber holders 23L and 23R. This movement allows the oblique wall 37K of the single-wire supporting part 37 to be aligned in the oblique walls 31B of the optical-fiber guide 31 easily. That is, the oblique wall 31B allows the center line O3 of the V-groove 39 to correspond to the center line O2 in the transverse direction T1. This operation align the V-groove 39 with the V-grooves 19L and 19R and positions the bare optical-fibers 33C and 35C to the V-grooves 19L and 19R Next, the optical-fiber guide 31 is lowered in this state, and the ends of the bare optical-fibers 33C and 35C are automatically and reliably received in the predetermined V-grooves 19L and 19R. Thereafter, the bare optical-fibers 33C and 35C are pressed from above by the clamp member (not illustrated). The optical-fibers holders 23L and 23R are moved inward, and the ends of the bare optical-fibers 33C and 35C of the single-wire optical-fibers 33A and 35A are abutted against each other precisely. The contacted bare optical-fibers 33C and 35C are fused and connected to each other by arc discharge which flows from the discharge electrode rod 5A of the optical-fiber fusion splicer means 5 to the discharge electrode rod SB.

If the alignment state is unsatisfactory, the positioning operation is again repeated to more reliably align the bare optical-fibers 33C and 35C in the predetermined V-grooves 19L and 19R.

According to another method, the optical-fiber guide 31 is moved upward to a position higher than the V-grooves 19L and 19R from the beginning. In a state where the sheaths 33B and 35B of the single-wire optical-fibers 33A and 35A are supported by the single-wire supporting part 37, the optical-fiber holders 23L and 23R hold the sheaths 33B and 35B, and the oblique wall 37K of the single-wire supporting part 37 is aligned in the oblique wall 31B of the optical-fiber guide 31. The optical-fiber guide 31 is then lowered. This method achieves the identical effect to that of the previous process.

With this structure, even if the bare optical-fibers 33C and 35C come out from the V-grooves 19L and 19R of the groove stage 15, the bare optical-fibers 33C and 35C are received in the predetermined V-grooves 19L and 19R automatically by the optical-fiber guide 31. This eliminates the necessity of the operator's positioning operation, and eliminates variation in operational speed which may be caused by difference in skill of operators.

After the device is reset by the optical-fiber holders 19L and 19R, the optical-fiber guide 31 moves vertically to align the bare optical-fibers 33C and 35C with each other automatically. This eliminates the need of positioning of the bare optical-fibers 33C and 35C in the slits, and the device is set efficiently unlike the latter conventional technique.

While the optical-fiber ribbon cords 7A and 9A are set to the optical-fiber holders 23L and 23R or detached therefrom, the optical-fiber guide 31 is lowered to a position lower than the V-grooves 19L and 19R. With this structure, even if the operator does not concentrate on the operation, it is possible to prevent the bare optical-fibers 33C and 35C from being damaged or bent, and excellent operability is achieved unlike the latter conventional technique.

The invention is not limited to the embodiments, and the invention may be carried out by another embodiment with appropriate modifications. In the optical-fiber alignment device 3 and the fusion splicer 1, the optical-fiber guide 31 is disposed on either side of the groove stage 15 one each. As another embodiment, a plurality of optical-fiber guides 31 may be disposed on either side of the groove stage 15 at predetermined distances from one another. In this case, the optical-fiber guides 31 allow the bare optical-fibers 7C and 9C (33C, 35C) to be more reliably received in the V-grooves 19L and 19R. The oblique walls 31B of the optical-fiber guide 31 may be increased in length, and the rising amount may be changed. This corresponds to optical-fiber of various number of wires.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of aligning optical-fibers comprising:
   holding a sheath of an optical-fiber ribbon cord using an optical-fiber holder so that distal ends of optical fibers extending from the sheath are located above grooves of a groove stage;
   arranging an optical-fiber guide on one side of the sheath, as the sheath is held by the optical-fiber holder, on a first side of the optical-fiber holder, wherein the optical-fiber guide has oblique portions adjacent to transverse sides of the sheath;
   moving the optical-fiber guide in a first direction toward the sheath so that at least one of the oblique portions aligns the sheath to the transverse center of the optical fiber guide; and moving the optical-fiber guide in a direction opposite the first direction to align the optical-fibers into the grooves of the groove stage.

2. The method of claim 1, further comprising aligning the transverse center of the optical-fiber guide with a transverse center of the grooves of the groove stage before moving the optical fiber guide in the direction opposite the first direction.

3. The method of claim 1, further comprising providing a second optical fiber holder, holding a second sheath, and a second optical-fiber guide arranged on one side of the second sheath.

4. A method of aligning optical fibers comprising:
holding a sheath of a single optical-fiber cable using an optical-fiber holder so that a distal end of an optical fiber extending from the sheath is located above a groove of a groove stage;
arranging a single optical-fiber support, having a groove for supporting the sheath of the single optical fiber, at a first end of the optical-fiber holder
arranging an optical-fiber guide on one side of the single optical-fiber support, wherein the optical-fiber guide has oblique portions adjacent to transverse sides of the single optical-fiber support;
moving the optical-fiber guide in a first direction toward the single optical-fiber support so that at least one of the oblique portions aligns the single optical-fiber support, and the single optical fiber supported thereon, to the transverse center of the optical-fiber guide; and
moving the optical-fiber guide in a direction opposite the first direction to align the single optical-fiber into the groove of the groove stage.

5. The method of claim 4, further comprising aligning the transverse center of the optical-fiber guide with a transverse center of the groove of the groove stage before moving the optical fiber guide in the direction opposite the first direction.

6. The method of claim 4, further comprising providing a second optical fiber holder, holding a second sheath, and a second optical-fiber guide arranged on one side of a second single optical-fiber support.

* * * * *